(12) United States Patent
Pamplin (10) Patent No.: US 10,383,482 B1
(45) Date of Patent: Aug. 20, 2019

(54) PORTABLE AND RECHARGEABLE BLENDER

(71) Applicant: Miramore Inc., Alameda, CA (US)

(72) Inventor: Ryan Michael Pamplin, Oakland, CA (US)

(73) Assignee: Miramore Inc., Alameda, CA (US)

( * ) Notice: Subject to any disclaimer, the term of this patent is extended or adjusted under 35 U.S.C. 154(b) by 0 days.

(21) Appl. No.: 16/237,183

(22) Filed: Dec. 31, 2018

(51) Int. Cl.
| | |
|---|---|
| *A47J 43/07* | (2006.01) |
| *H02J 7/00* | (2006.01) |
| *A47J 43/08* | (2006.01) |
| *A47J 43/046* | (2006.01) |

(52) U.S. Cl.
CPC ......... *A47J 43/0722* (2013.01); *A47J 43/046* (2013.01); *A47J 43/075* (2013.01); *A47J 43/0766* (2013.01); *A47J 43/085* (2013.01); *H02J 7/0027* (2013.01); *H02J 7/0052* (2013.01); *H02J 2007/0062* (2013.01)

(58) Field of Classification Search
CPC .... A47J 43/0722; A47J 43/085; A47J 43/075; A47J 43/0766; A47J 43/046; H02J 7/0052; H02J 7/0027; H02J 2007/0062
See application file for complete search history.

(56) References Cited

U.S. PATENT DOCUMENTS

| | | | | |
|---|---|---|---|---|
| 3,931,494 A * | 1/1976 | Fisher | ................. | A47J 36/2461 219/441 |
| 4,095,090 A * | 6/1978 | Pianezza | ............. | A47G 19/2288 219/435 |
| 4,435,084 A * | 3/1984 | Calhoun | ................. | B01F 7/162 366/130 |
| 4,487,509 A * | 12/1984 | Boyce | ................... | A47J 43/046 366/199 |
| 5,425,579 A * | 6/1995 | Sampson | ................ | B01F 7/162 366/130 |
| 5,639,161 A * | 6/1997 | Sirianni | ................... | B01F 7/162 366/205 |
| 6,568,843 B1 * | 5/2003 | Lai | ........................ | A47J 43/046 241/37.5 |
| 6,614,206 B1 * | 9/2003 | Wong | .................... | G06F 1/1632 320/135 |
| 7,314,307 B2 * | 1/2008 | Cai | ...................... | A47J 43/0465 366/273 |
| 7,364,348 B1 * | 4/2008 | Jones | ..................... | A47J 43/042 366/130 |
| 7,384,182 B2 * | 6/2008 | Bhavnani | .............. | A47J 43/046 366/130 |
| 7,422,362 B2 * | 9/2008 | Sands | ................. | A47J 43/0716 366/205 |
| 7,518,343 B2 * | 4/2009 | Veselic | .................. | G06F 1/266 320/155 |
| 9,035,222 B2 * | 5/2015 | Alexander | ........... | A47G 19/027 165/58 |
| 9,039,274 B1 * | 5/2015 | Corda | ................... | A47J 43/046 366/199 |

(Continued)

*Primary Examiner* — Tony G Soohoo
(74) *Attorney, Agent, or Firm* — Esplin & Associates, PC (57) ABSTRACT

A portable and rechargeable blender is disclosed. Exemplary implementations may include a base assembly, a container assembly, and control circuitry. The base assembly may include a rechargeable battery configured to power an electrical motor such that, during blending by the blender, no power is supplied to the electrical motor from an external power source.

12 Claims, 6 Drawing Sheets

(56) References Cited

U.S. PATENT DOCUMENTS

| | | | | |
|---|---|---|---|---|
| 9,549,639 B2* | 1/2017 | Garr | ..................... | A47J 43/27 |
| 9,787,130 B2* | 10/2017 | Kim | ..................... | H02J 7/34 |
| 9,814,331 B2* | 11/2017 | Alexander | ............ | A47G 19/027 |
| 10,010,213 B2* | 7/2018 | Alexander | ............ | A47J 36/2472 |
| 10,143,980 B1 | 12/2018 | Marko | | |
| 10,188,229 B2* | 1/2019 | Alexander | ............ | A47G 19/027 |
| 2001/0036124 A1* | 11/2001 | Rubenstein | ............ | A47G 19/2205 366/205 |
| 2007/0209528 A1* | 9/2007 | Chang | ............ | A47J 19/027 99/511 |
| 2007/0290555 A1* | 12/2007 | Caren | ............ | H02J 7/0055 307/31 |
| 2008/0259722 A1* | 10/2008 | Sanford | ............ | A47J 43/0722 366/205 |
| 2008/0265838 A1* | 10/2008 | Garg | ............ | G06F 1/266 320/115 |
| 2010/0005977 A1* | 1/2010 | Menashes | ............ | A47J 43/06 99/510 |
| 2010/0301808 A1* | 12/2010 | David | ............ | H02J 7/0055 320/138 |
| 2011/0248108 A1* | 10/2011 | Carriere | ............ | A47J 43/0722 241/33 |
| 2013/0222991 A1* | 8/2013 | McWilliams | ............ | G06F 1/1632 361/679.4 |
| 2014/0301155 A1* | 10/2014 | Montgomery | ............ | A47J 43/0716 366/142 |
| 2016/0235243 A1* | 8/2016 | Grassia | ............ | A47J 31/4489 |
| 2017/0104297 A1* | 4/2017 | Scott | ............ | H01R 13/6675 |
| 2017/0110898 A1* | 4/2017 | Kyriakoulis | ............ | H02J 7/0042 |
| 2018/0146826 A1* | 5/2018 | Mizrahi | ............ | A47J 43/042 |

* cited by examiner

PORTABLE AND RECHARGEABLE BLENDER

FIELD OF THE DISCLOSURE

The present disclosure relates to a portable and rechargeable blender.

BACKGROUND

Blenders are known, typically as consumer-grade home appliances. Rechargeable batteries are known.

SUMMARY

One aspect of the present disclosure relates to a portable and rechargeable blender configured to blend foodstuffs. By virtue of true portability, a user can take the blender anywhere and create drinks, shakes, smoothies, baby food, sauces, and/or other concoctions. Once the blender is fully charged, a user can prepare multiple servings quickly and easily. Lack of an external power source, much less a reliable external power source, is no longer preventing users from enjoying the benefits of blended drinks.

The blender may include a base assembly, a container assembly, control circuitry, and/or other components. As used herein, the term "foodstuffs" may include ingredients ranging from solid to liquid, from hot to cold or frozen, in any combination. As used herein, the term "ingredient" merely connotates something fit to ingest, and not necessarily nutritional value.

As used herein, any association (or relation, or reflection, or indication, or correspondency) involving assemblies, blades, motors, batteries, couplings, interfaces, detectors, indicators, magnetic elements, caps, filters, rotations, and/or another entity or object that interacts with any part of the blender and/or plays a part in the operation of the blender, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
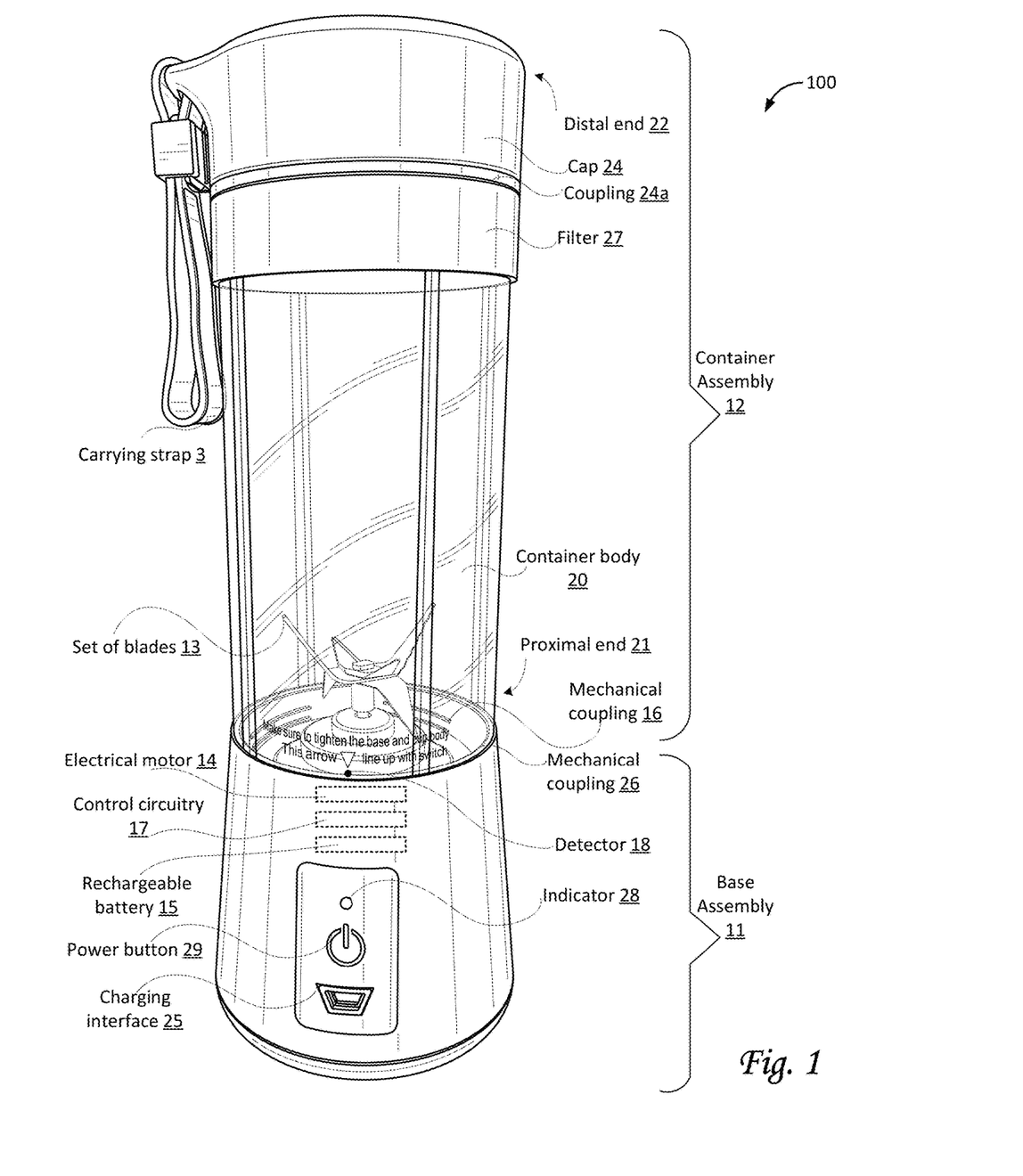
FIG. 1 shows a portable and rechargeable blender configured to blend foodstuffs, in accordance with one or more implementations.

FIG. 1 shows a portable and rechargeable blender 100 (hereinafter blender 100) configured to blend foodstuffs, in accordance with one or more implementations. Blender 100 may include one or more of a base assembly 11, a container assembly 12, control circuitry 17 (depicted in FIG. 1 as a dotted rectangle to indicate this component may be embedded within base assembly 11, and not readily visible from the outside), and/or other components. Base assembly 11 and container assembly 12 may be configured to be coupled during blending by blender 100. For example, in some implementations, base assembly 11 and container assembly 12 may be mechanically coupled, e.g., through one or more threaded couplings. In some implementations, control circuitry 17 may be included in base assembly 11. Other types of couplings may be envisioned for blender 100, though leak-proof options may be preferred, since most uses include one or more liquid ingredients.

Figure 2:
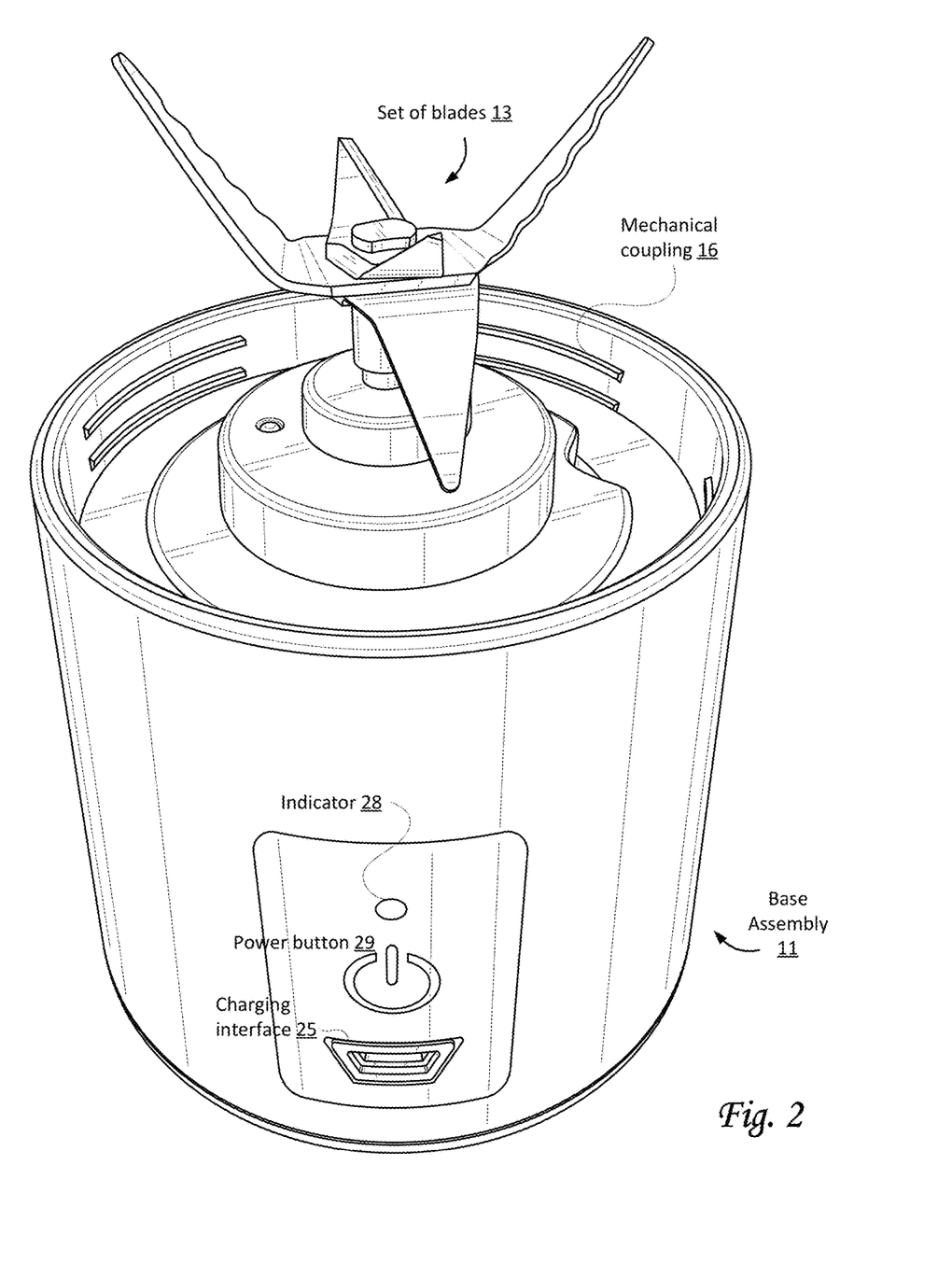
FIG. 2 shows a base assembly for a portable and rechargeable blender, in accordance with one or more implementations.

Base assembly 11 may include one or more of a set of one or more blades 13 (also referred to as set of blades 13), an electrical motor 14 (depicted in FIG. 1 as a dotted rectangle to indicate this component is embedded within base assembly 11), a rechargeable battery 15 (depicted in FIG. 1 as a dotted rectangle to indicate this component is embedded within base assembly 11), a standardized charging interface 25, a first mechanical coupling 16, a detector 18, an indicator 28, a power button 29, and/or other components. By way of non-limiting example, FIG. 2 illustrates base assembly 11, in accordance with one or more implementations. In some implementations, first mechanical coupling 16 may be a threaded coupling. In some implementations, first mechanical coupling 16 may be a female threaded coupling configured to fit together with second mechanical coupling 26 of container assembly 12 (in FIG. 1).

In some implementations, base assembly 11 may have a cylindrical shape. In some implementations, the cylindrical shape of base assembly 11 may have a diameter between 2 and 4 inches. In some implementations, the cylindrical shape of base assembly 11 may have a diameter between 2.5 and 3 inches. Such a diameter may improve portability, as well as allow blender 100 to be stored in a cup holder, e.g., in a vehicle.

Figure 3:
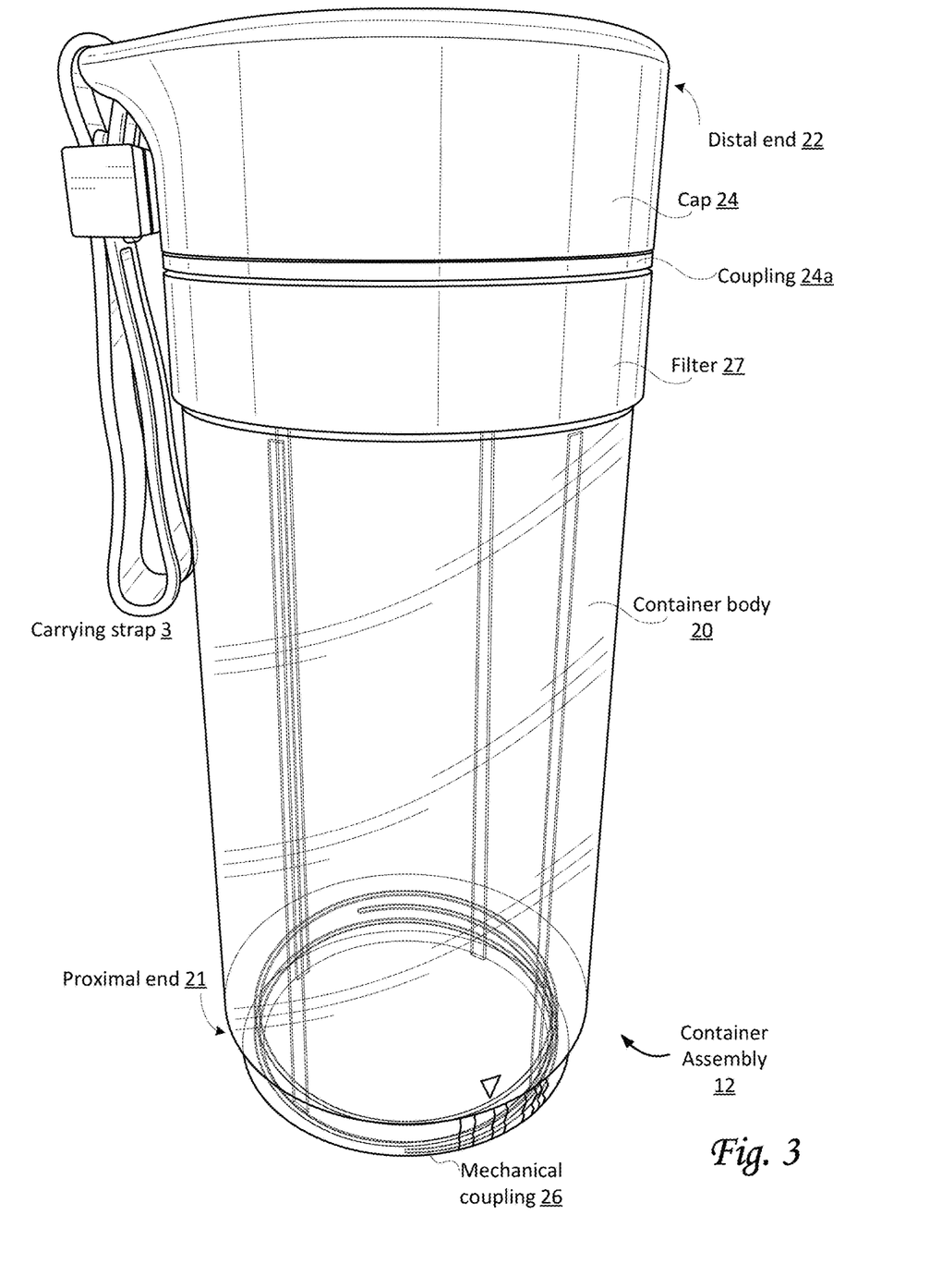
FIG. 3 shows a container assembly for a portable and rechargeable blender, in accordance with one or more implementations.

Referring to FIG. 1, container assembly 12 may include one or more of a proximal end 21, a distal end 22, a container body 20, a second mechanical coupling 26, a filter 27, a cap 24, a coupling 24a, a carrying strap 3, and/or other components. Container body 20 may form a vessel to hold and/or contain foodstuffs within container assembly 12. In some implementations, the dimensions of container assembly 12 may be such that the internal volume of container assembly 12 can hold 10, 12, 14, 16, 18, 20, 22, or more ounces. In some implementations, container assembly 12 and/or container body 20 may have cylindrical shapes. In some implementations, the cylindrical shapes of container assembly 12 and/or container body 20 may have a diameter between 2 and 4 inches. In some implementations, the cylindrical shapes of container assembly 12 and/or container body 20 may have a diameter between 2.5 and 3 inches. In some implementations, container body 20 may be transparent. By way of non-limiting example, FIG. 3 illustrates container assembly 12, in accordance with one or more implementations. In some implementations, second mechanical coupling 26 may be a threaded coupling. In some implementations, second mechanical coupling 26 may be a male threaded coupling configured to fit together with first mechanical coupling 16 of base assembly 11 (in FIG. 1).

Referring to FIG. 1, set of blades 13 may be rotatably mounted to base assembly 11 to blend foodstuffs. In some implementations, set of blades 13 may be disposed at or near proximal end 21 of container assembly 12 during blending by blender 100. In some implementations, set of blades 13 may include 1, 2, 3, 4, 5, 6, 7, 8, or more blades. In some implementations, as depicted in the upright configuration of blender 100 in FIG. 1, set of blades 13 may includes six blades. In some implementations, set of blades 13 may include at least two downward blades, which may prevent and/or reduce foodstuffs remaining unblended when disposed under the upward blades. In some implementations, set of blades 13 may include at least four upward blades. In some implementations, including six blades may be preferred over including less than six blades, in particular for blending ice and/or ice cubes. By using more blades, more points of contact will hit the ice at substantially the same time, which reduces the likelihood that a piece of ice is merely propelled rather than crushed and/or blended, in particular for implementations having limited power, such as disclosed herein. As used herein, directional terms such as upward, downward, left, right, and so forth are relative to FIG. 1 unless otherwise noted. In some implementations, set of blades may be configured to rotate around a longitudinal axis of blender 100.

Electrical motor 14 may be configured to rotationally drive set of blades 13. In some implementations, electrical motor 14 may operate at a voltage between 5V and 10V. In one or more preferential implementations, electrical motor 14 may operate at a voltage of about 7.4V. In some implementations, electrical motor 14 may be configured to spin set of blades 13 at a maximum speed between 20,000 rotations per minute (RPM) and 30,000 RPM. In one or more preferential implementations, electrical motor 14 may spin set of blades 13 at a maximum speed of about 22,000 RPM. Electrical motor may be configured to be powered by rechargeable battery 15. Simultaneously, in some implementations, electrical motor 14 may be further configured to be powered through standardized charging interface 25, though that may not be the preferred way of operating blender 100. In one or more preferential implementations, no power is supplied to electrical motor 14 from an external power source during blending by blender 100. In some implementations, control circuit 17 may be configured to control electrical motor 14 during rotation of set of blades 13. For example, control circuit 17 may control the speed of the rotation of set of blades 13 during blending by blender 100.

Rechargeable battery 15 may be configured to power electrical motor 14. In some implementations, rechargeable battery 15 may be configured to power electrical motor 14 such that, during blending by blender 100, no power is supplied to electrical motor 14 from an external power source. In some implementations, rechargeable battery 15 may be non-removable. As used herein, the term "non-removable" may mean not accessible to users during common usage of blender 100, including charging, blending, cleaning, and storing for later use. In some implementations, rechargeable battery 15 may have a capacity between 1000 mAh and 4000 mAh. In one or more preferential implementations, rechargeable battery 15 may have a capacity of about 2000 mAh. In some implementations, control circuit 17 may be configured to control charging of rechargeable battery 15. For example, control circuit 17 may control the transfer of electrical power through standardized charging interface 25 into rechargeable battery 15. For example, responsive to a detection that rechargeable battery 15 is fully charged, control circuit 17 may prevent the transfer of electrical power through standardized charging interface 25 into rechargeable battery 15.

Standardized charging interface 25 may be configured to conduct electrical power to rechargeable battery 15. In some implementations, standardized charging interface 25 may be configured to conduct electrical power to charge rechargeable battery 15, e.g., from an external power source. In some implementations, standardized charging interface 25 may be configured to support wireless charging of rechargeable battery 15, e.g., from an external power source, including but not limited to induction-based charging. In some implementations, standardized charging interface 25 may be a universal serial bus (USB) port configured to receive an electrical connector for charging rechargeable battery 15. In such a case, the electrical connector may be connected to an external power source. In some implementations, standardized charging interface 25 may be covered for protection and/or other reasons.

First mechanical coupling 16 of base assembly 11 may be configured to couple base assemble 11 to container assembly 12. In some implementations, first mechanical coupling 16 may be a threaded coupling. In some implementations, first mechanical coupling 16 may have a parallel thread.

Detector 18 may be configured to detect whether first mechanical coupling 16 of base assembly 11 is engaged with second mechanical coupling 26 of container assembly 12. In some implementations, detector 18 may be configured to detect whether first mechanical coupling 16 of base assembly 11 is engaged with second mechanical coupling 26 of container assembly 12 to couple base assembly 11 to container assembly 12. In some implementations, operation of detector 18 may use one or more magnetic elements. For example, in some implementations, one or more magnetic elements are included in container body 20 at or near proximal end 21 of container assembly 12. Engagement may be detected responsive to these one or more magnetic elements being aligned and sufficiently close to one or more matching magnetic elements that may be included in base assembly 11 (e.g., at or near first mechanical coupling 16 of base assemble 11).

Indicator 28 may be configured to illuminate in various colors (red, blue, etc.) and/or patterns (solid, fast blinking, slow blinking, alternating red and blue, etc.). Indicator 28 may convey information regarding the operational status of blender 100 to a user. The operation status of blender 100 may be determined by control circuitry 17. Indicator 28 may be controlled by control circuitry 17. For example, if indicator 28 is solid red, blender 100 may be charging and/or insufficiently charged to blend. For example, if indicator 28 is solid blue, blender 100 may be ready for blending. For example, if indicator 28 is alternating red and blue, blender 100 may not be ready for blending due to base assembly 11 and container assembly 12 not being coupled properly and/or fully. For example, in some implementations, threaded couplings between assembly 11 and container assembly 12 may need to be tightened sufficiently for proper blending, and indicator 28 may warn the user when the treaded couplings are not tightened sufficiently.

Power button 29 may be part of the user interface of blender 100. Power button 29 may be configured to be engaged manually by the user, for example by pushing power button 29 to turn blender 100 on and off. In some implementations, control by a user of blender 100 may be based on a switch (not shown), a touchscreen (not shown), voice-controlled operation (not shown), gesture-based operation (not shown), and/or other types of user interfaces suitable to turn consumer appliances on and off.

Control circuitry 17 may be configured to control different functions and/or operations of blender 100, including but limited to turning blender 100 on and off, charging of rechargeable battery 15, controlling of electrical motor 14 regarding and/or during rotation of set of blades 13, determining whether first mechanical coupling 16 is engaged with second mechanical coupling 26, controlling operation of indicator 28, and/or performing other functions for blender 100. In some implementations, control circuitry 17 may be configured to prevent rotation of set of blades 13 responsive to a determination that first mechanical coupling 16 of base assembly 11 is not engaged (or not engaged properly for the intended operation of blender 100) with second mechanical coupling 26 of container assembly 12. In some implementations, control circuitry 17 may be configured to control indicator 28 to convey information regarding the operational status of blender 100 to a user. For example, indicator 28 may include a light that can illuminate in various colors and/or patterns. In some implementations, control circuitry 17 may be implemented as a printed circuit board (PCB).

Proximal end 21 of container assembly 12 may be disposed near set of blades 13 during blending of blender 100. Distal end 22 of container assembly 12 may be disposed opposite proximal end 21.

Second mechanical coupling 26 of container assembly 12 may be disposed at or near proximal end 21 of container assembly 12. Second mechanical coupling 26 may be configured to engage first mechanical coupling 16 to couple base assembly 11 to container assembly 12. In some implementations, first mechanical coupling 16 and second mechanical coupling 26 may be threaded couplings. In some implementations, first mechanical coupling 16 and second mechanical coupling 26 may have parallel threads.

Figure 4:
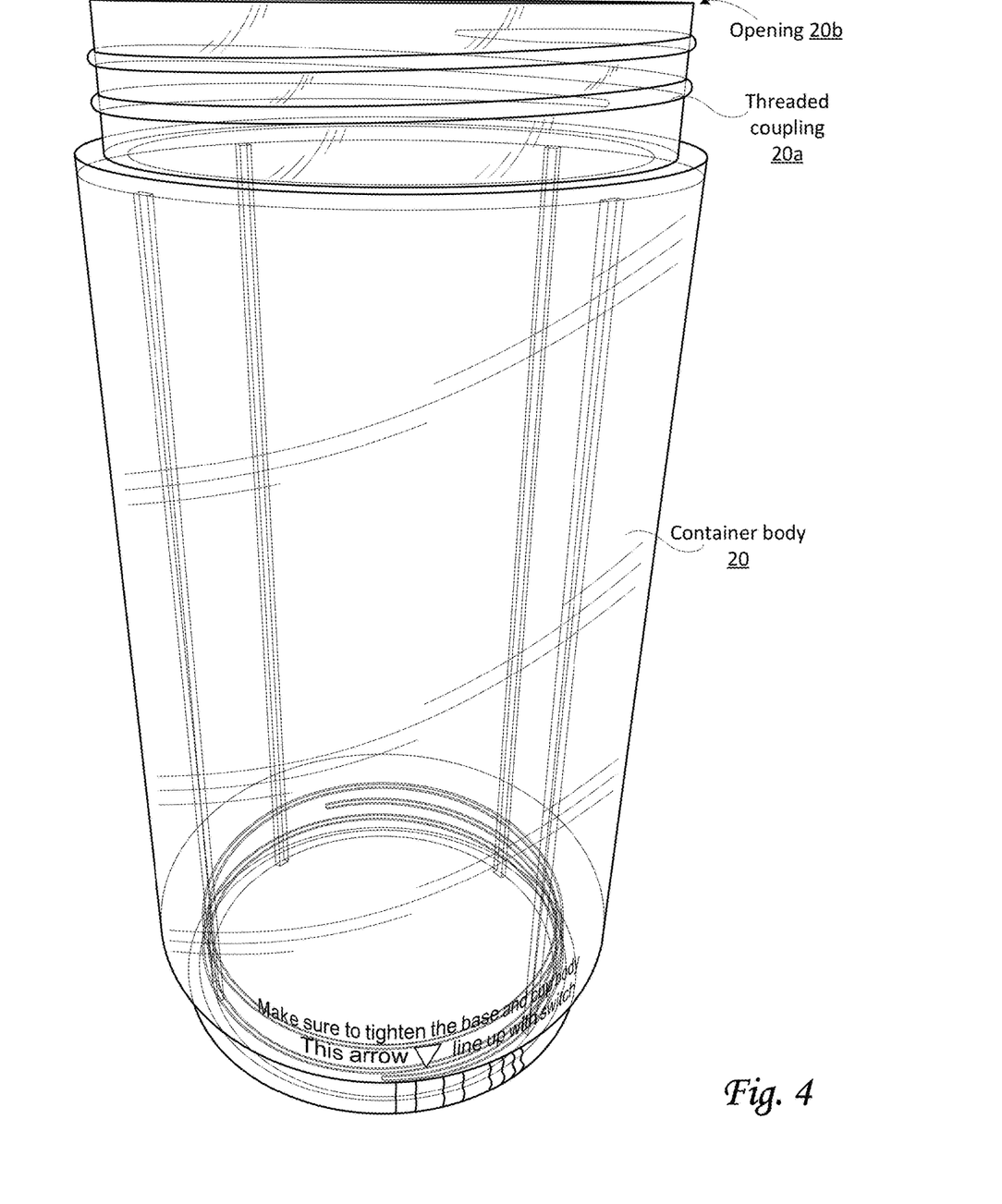
FIG. 4 shows a container body for a portable and rechargeable blender, in accordance with one or more implementations.
Figure 5:
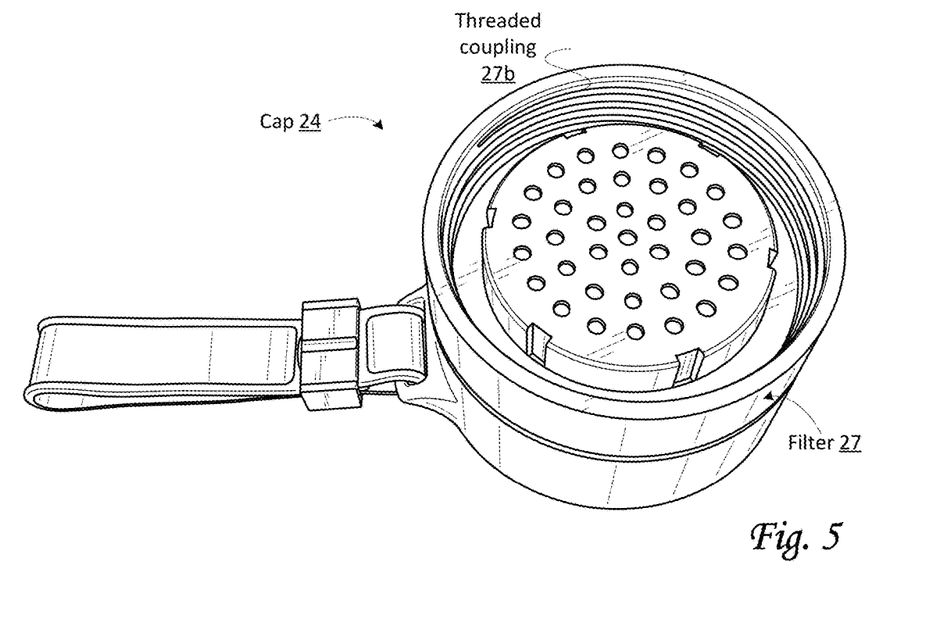
FIG. 5 shows a cap for a portable and rechargeable blender, in accordance with one or more implementations.

Cap 24 may be disposed at or near distal end 22 of container assembly 12. In some implementations, cap 24 may be removable. For example, removing cap 24 may create an opening at distal end 22 of container assembly 12. In some implementations, blended foodstuffs may be removed through this opening, e.g., by pouring. By way of non-limiting example, FIG. 5 illustrates a bottom-side up view of cap 24 (together with filter 27), in accordance with one or more implementations. In some implementations, cap 24 may include a threaded coupling 27b that is configured to engage with container body 20 (as shown in FIG. 1 and FIG. 4). In some implementations, the combination of cap 24 and filter 27 may include a threaded coupling 27b that is configured to engage with container body 20 (as shown in FIG. 1 and FIG. 4). In particular, in some implementations, threaded coupling 27b may be a male threaded coupling configured to fit together with threaded coupling 20a of container body 20 (shown in FIG. 4). In some implementations, once cap 24 and filter 27 have been removed from container body 20 and/or container assembly 12, an opening 20b is formed at the top of container body 20, through which foodstuffs may be removed from container body 20. In some implementations, cap 24 may include a spout, indentation, and/or other shape of its structure that may be used to pour and/or drink from. For example, such an opening may be coverable during blending of blender 100.

Referring to FIG. 1, in some implementations, coupling 24a of container assembly 12 may be configured to removably couple cap 24 to container body 20 and/or other components of container assembly 12. In some implementations, coupling 24a of container assembly 12 may be configured to removably couple cap 24 to filter 27. In some implementations, coupling 24a may be a threaded coupling. In some implementations, coupling 24a may have a parallel thread.

Figure 6:
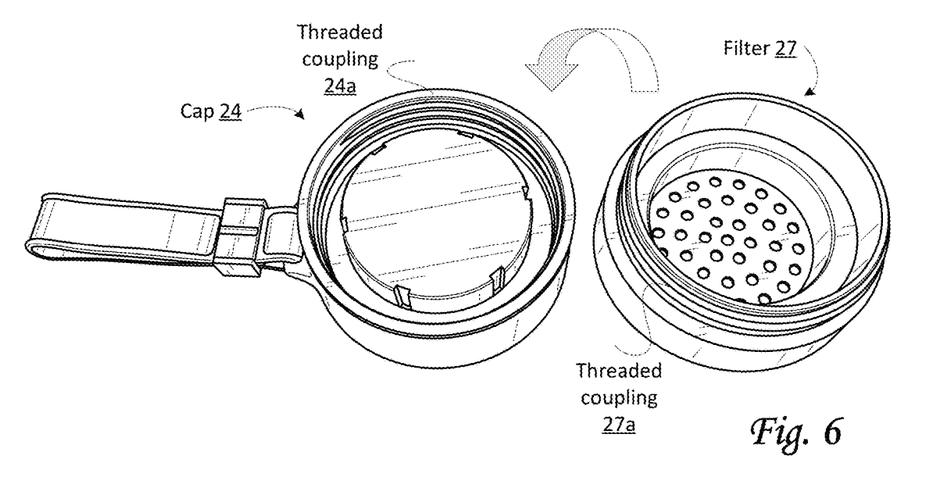
FIG. 6 shows how a filter and a cap fit together for use with a portable and rechargeable blender, in accordance with one or more implementations.
Figure 7:
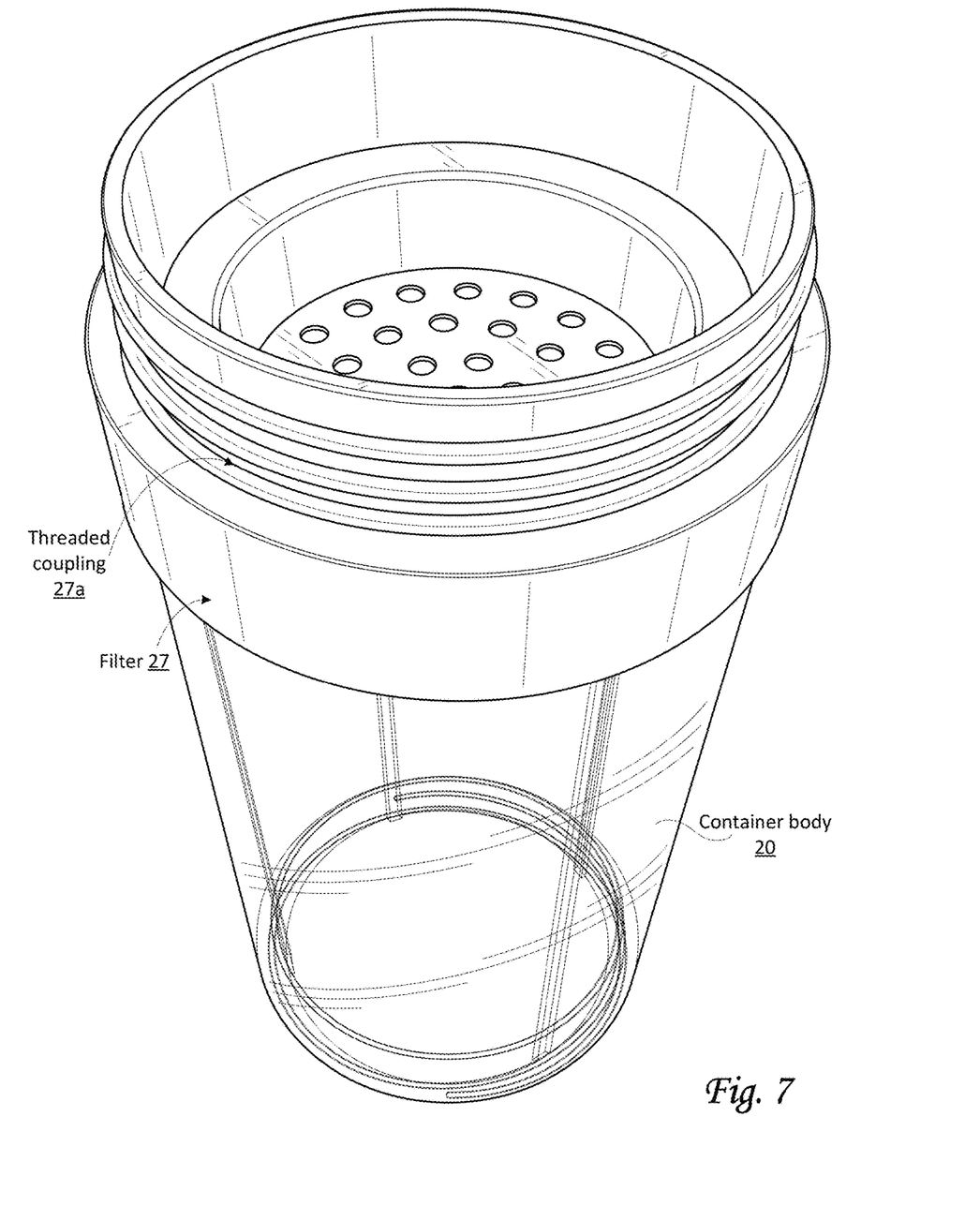
FIG. 7 shows a container body and a filter together for use with a portable and rechargeable blender, in accordance with one or more implementations.

Filter 27 may be configured to strain blended foodstuffs, including but not limited to pulp and other suspensions. In some implementations, filter 27 may be removable. By way of non-limiting example, FIG. 6 illustrates how filter 27 and cap 24 may fit together for use with blender 100, in accordance with one or more implementations. Once filter 27 is turned over, threaded coupling 27a may fit together with threaded coupling 24a of cap 24. In some implementations, threaded coupling 27a may be a male threaded coupling, and threaded coupling 24a may be a female threaded coupling. In some implementations, filter 27 may be coupled to container body 20 without cap 24. By way of non-limiting example, FIG. 7 illustrates a combination of container body 20 and filter 27. By virtue of the holes in filter 27, a liquid within container body 20 may be strained through filter 27 (assuming that in such a scenario container body 20 is coupled to base assembly 11 (not shown).

Referring to FIG. 1, carrying strap 3 may be configured to carry blender 100.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A portable and rechargeable blender configured to blend foodstuffs, the blender comprising:
a base assembly, a container assembly, a detector, and control circuitry, wherein the base assembly includes:
a set of one or more blades permanently mounted to the base assembly, wherein the set of one or more blades is configured to rotate and blend the foodstuffs;

an electrical motor configured to drive the rotation of the set of one or more blades, wherein the electrical motor is integrated permanently into the base assembly;

a rechargeable battery configured to power the electrical motor such that, during blending by the blender, no power is supplied to the electrical motor from an external power source, wherein the rechargeable battery is integrated permanently into the base assembly such that the base assembly forms an integral whole;

a standardized charging interface configured to conduct electrical power to the rechargeable battery;

a power button configured to be engaged manually by a user to turn the blender on and off; and a first mechanical coupling configured to couple the base assembly to the container assembly;

wherein the container assembly is configured to hold the foodstuffs within a container body during blending by the blender, the container assembly including:

a proximal end that is open and that is disposed, subsequent to the base assembly being coupled to the container assembly, near the set of one or more blades;

a distal end opposite the proximal end; and a second mechanical coupling disposed at or near the proximal end, wherein the second mechanical coupling is configured to engage the first mechanical coupling of the base assembly to couple the base assembly to the container assembly, and wherein the container body includes one or more magnetic elements disposed at or near the proximal end of the container assembly;

wherein the detector is configured to detect whether the first mechanical coupling is engaged with the second mechanical coupling in a manner operable and suitable for blending by the blender, wherein detection by the detector is based on proximity of the magnetic elements in the detector with the one or more magnetic elements included in the container body; and wherein the control circuitry is configured to:

control charging of the rechargeable battery through the standardized charging port;

control the electrical motor during rotation of the set of one or more blades;

determine whether the first mechanical coupling is engaged with the second mechanical coupling in the manner operable and suitable for blending by the blender, wherein the determination is based on the detection by the detector; and allow or prevent rotation of the set of one or more blades, based on the determination whether the first mechanical coupling is engaged with the second mechanical coupling in the manner operable and suitable for blending by the blender.

2. The blender of claim 1, where the rechargeable battery is not user-replaceable.

3. The blender of claim 1, wherein the standardized charging interface is a universal serial bus (USB) port configured to receive an electrical connector for charging the rechargeable battery.

4. The blender of claim 1, wherein the standardized charging interface is configured to support wireless charging of the rechargeable battery.

5. The blender of claim 1, wherein the first and second mechanical couplings are threaded couplings.

6. The blender of claim 1, wherein the container assembly has a volume between 10 and 22 ounces.

7. The blender of claim 1, wherein the base assembly has a cylindrical shape having a diameter between 2 and 4 inches.

8. The blender of claim 1, wherein the rechargeable battery has a capacity between 1000 mAh and 4000 mAh.

9. The blender of claim 1, wherein the electrical motor is configured to operate at a voltage between 5V and 10V, and wherein the electrical motor is configured to spin the set of one or more blades at a speed between 20,000 and 30,000 rotations per minute.

10. The blender of claim 1, wherein the container assembly further includes a removable cap disposed at or near the distal end.

11. The blender of claim 10, wherein the container assembly further includes a removable filter disposed at or near the distal end, wherein the removable filter is configured to strain blended foodstuffs when the blended foodstuffs are removed from the container assembly through an opening created by removing the removable cap.

12. The blender of claim 1, wherein the control circuitry is included in the base assembly.

* * * * *